Oct. 4, 1960 P. DREPTIN 2,954,829
VARIABLE PITCH PROPELLER FOR AIRPLANES
OR OTHER FLYING MACHINES
Filed Oct. 29, 1954 7 Sheets-Sheet 2

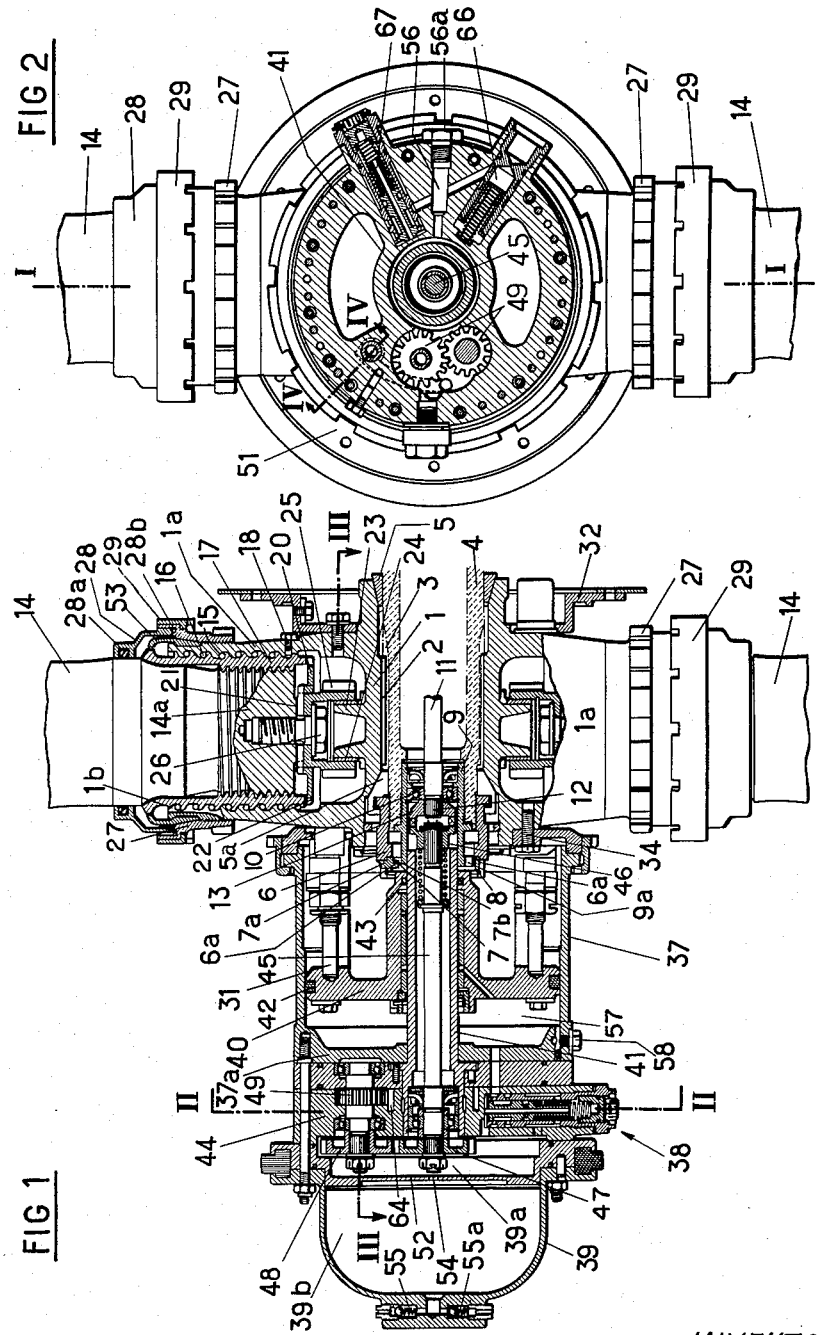

INVENTOR
Paul Dreptin
BY Holcomb, Wetherill & Brisebois
ATTORNEYS

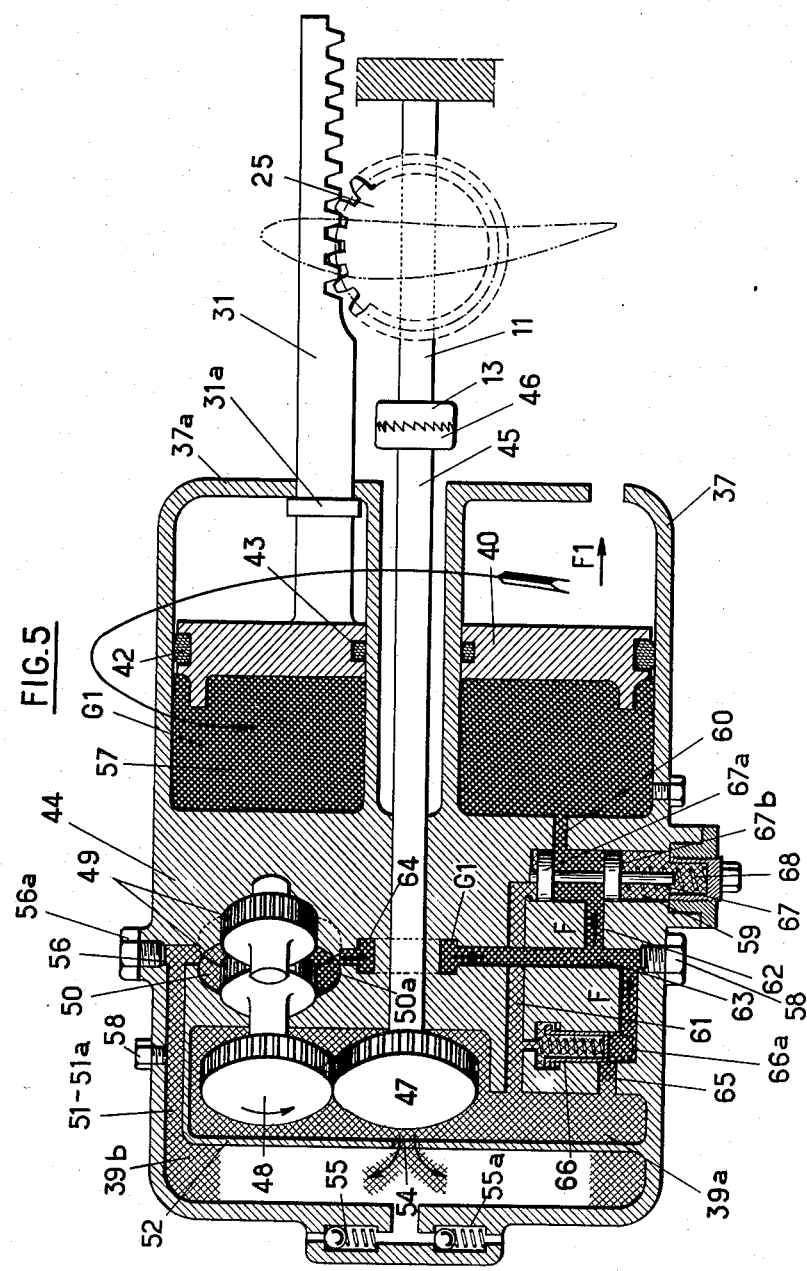

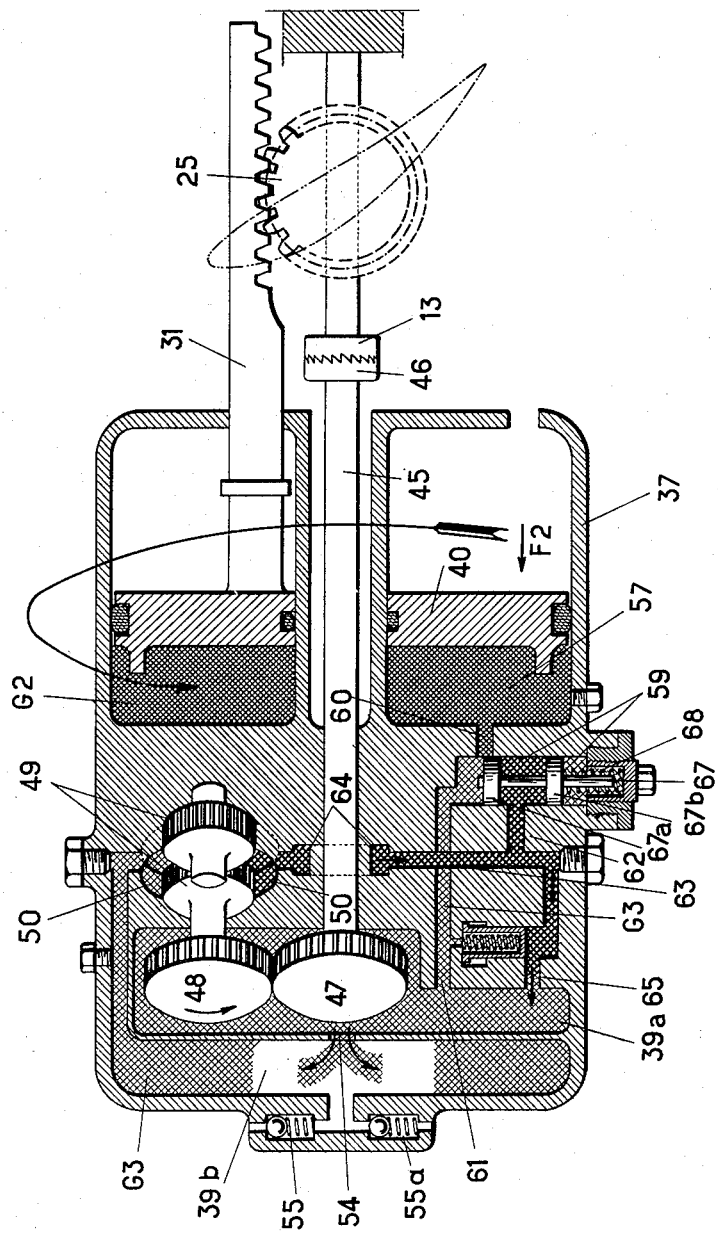

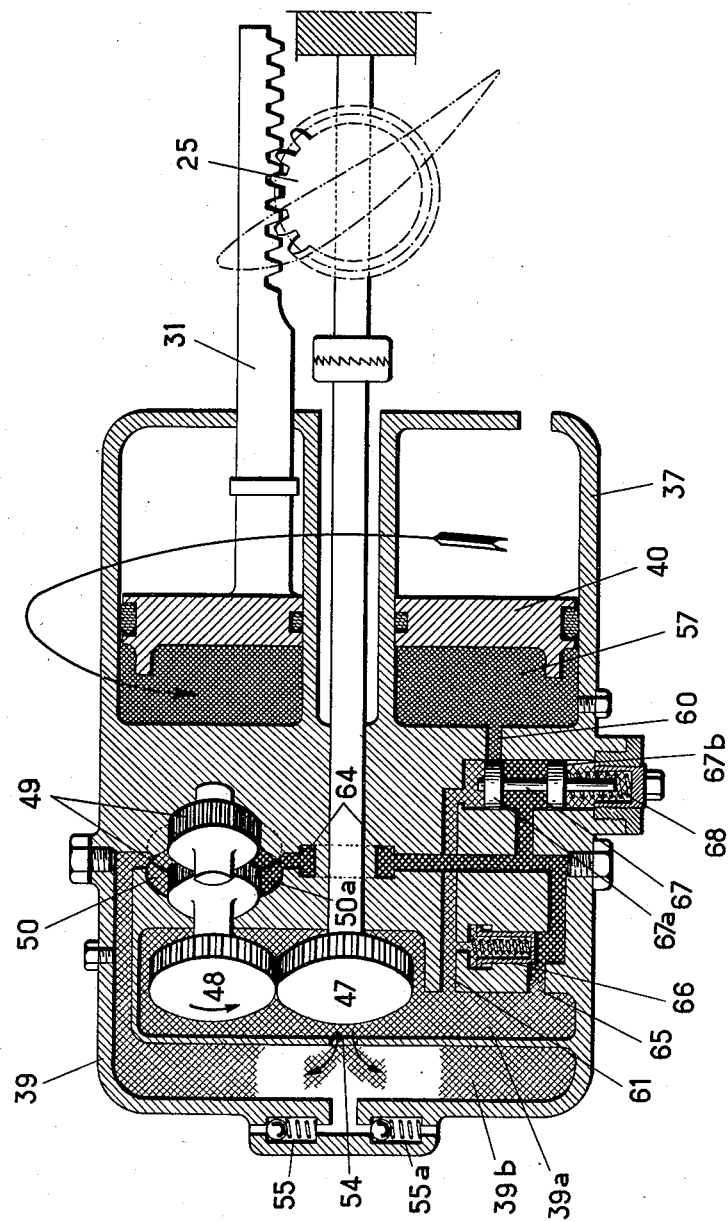

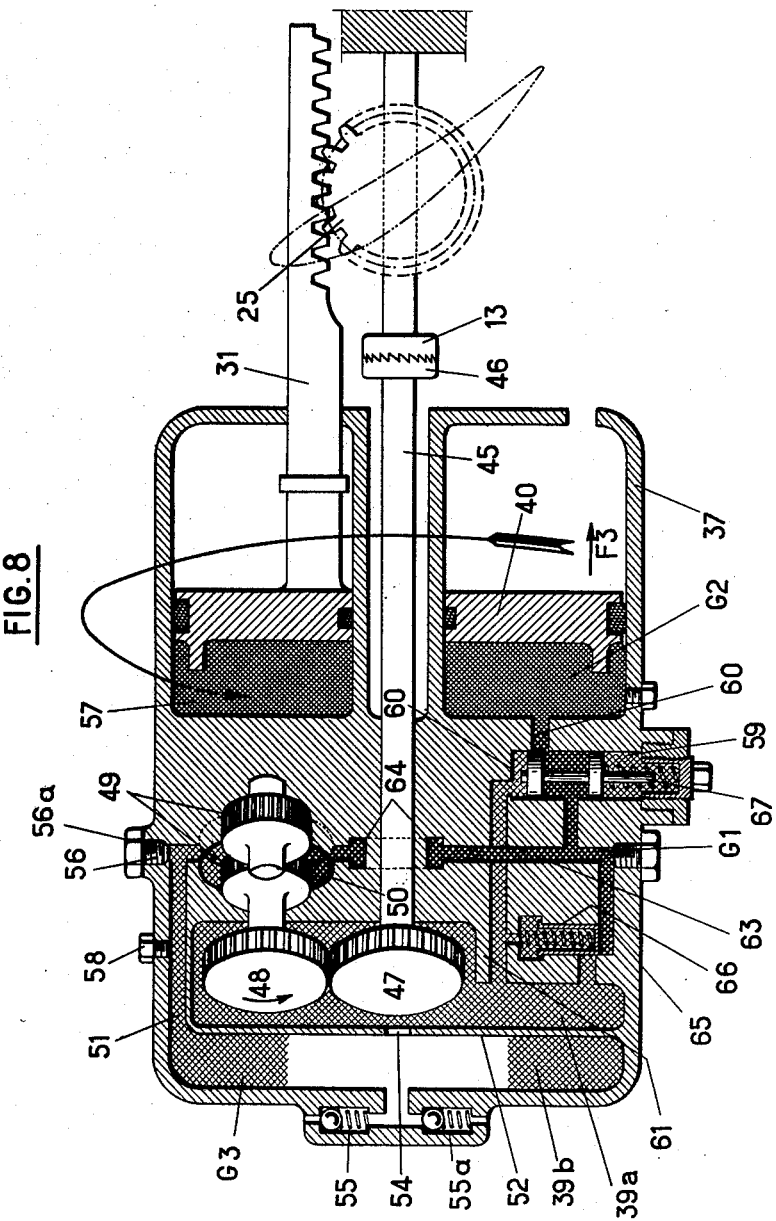

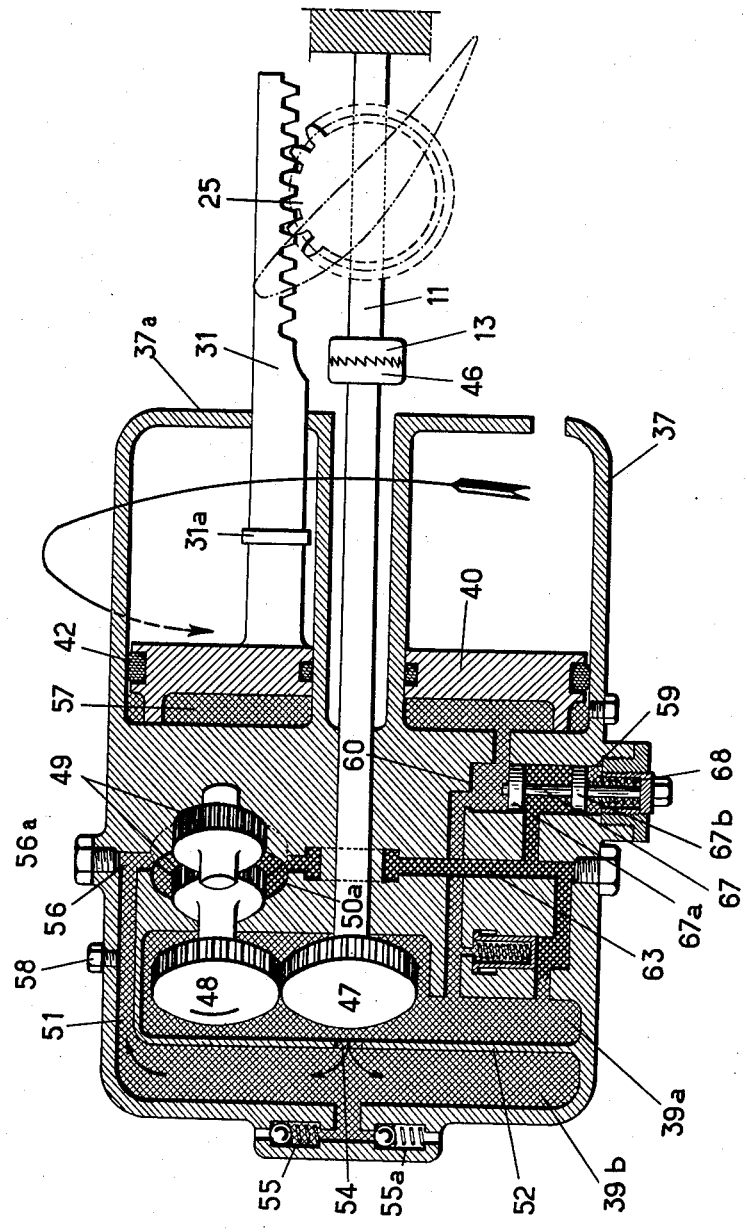

United States Patent Office 2,954,829
Patented Oct. 4, 1960

2,954,829

VARIABLE PITCH PROPELLER FOR AIRPLANES OR OTHER FLYING MACHINES

Paul Dreptin, Issy-les-Moulineaux, France, assignor to Ratier Aviation-Marine, Montrouge, France, a corporation of France Filed Oct. 29, 1954, Ser. No. 465,711

Claims priority, application France July 28, 1954

1 Claim. (Cl. 170—160.11)

The object of the present invention is a new article of manufacture which constitutes a variable pitch propeller for airplanes or other flying machines, characterized by the fact that it comprises, so organized as to form an independently rotating assembly:

A hub provided with arms having helical ball bearing races on which the blades are mounted;

Quick acting hydraulic means, the output of which is controlled by means of a centrifugal regulator assuring the distribution of the fluid in accordance with a function of the propeller speed, and Single acting piston means fixed to a rack and providing the mechanical connection between the centrifugal hydraulic regulating means and the aforesaid blades.

In general such an assembly embodies the following features, taken separately or in combination:

(a) The rotation of the propeller creates two principal opposing forces: a torque which tends to turn the blades toward low pitch and a centrifugal torque resulting from the centrifugal force exerted by the blades on the helical ramp which tends to turn the blades toward high pitch.

(b) The lead of the pitch of the helical races for the blades is so calculated as to favor the aforesaid centrifugal force, the propeller consequently tending to turn toward "high pitch";

(c) The racks, fixed to single acting pistons, are actuated by pinions fixed to the hub ends of the blades;

(d) These racks are mounted at the forward edges of the blades so that the piston receives a push which tends to move it away from the pinions;

(e) The hydraulic force acting on the piston in cooperation with the governor is furnished by a gear pump, the suction of which is in communication with an oil reservoir positioned in front of the propeller; this pump is actuated by a pinion which rolls about a planetary gear rigidly fixed on a stationary shaft extending from the reduction gearing of the turbine or other motor and the oil under pressure discharged by the pump communicates, on the one hand, with a pressure valve and, on the other hand, with the centrifugal regulator.

(f) The means for regulating the displacement of the pump comprises a cylindrical chamber provided with a centrifugal distributor having an orifice communicating with the oil discharged under pressure by the pump and an orifice permitting the discharge of this oil under pressure into the pressure chamber of the piston (low pitch) or the escape of oil from that chamber towards the oil reservoir (high pitch);

(g) The centrifugal distributor consists of a suitable balanced slide valve biased by an adjustable spring, the displacement of which by centrifugal force (which varies with the propeller speed), determines the size of the orifice necessary to obtain equilibrium with the mechanical force exerted by the piston; the arrangement of fluid passages and slide valve being such that the opening or closing of these automatically brings the propeller to "zero pitch," takes care of its regulation and eventually brings it to high pitch against the stop.

In order that the subject matter of the invention may be better understood, one embodiment thereof will now be described, solely by way of illustration, and without in any way limiting the scope of the invention thereto.

In the drawings:

Figure 1 is a longitudinal cross-section taken along the line I—I of Figure 2, showing the mounting of the propeller blades and the details of the automatic governor;

Figure 2 is a cross-sectional view taken along the line II—II of Figure 1;

Figures 5, 6, 7, 8 and 9 are schematic views designed to facilitate the explanation of the operation of the automatic governor.

Figure 3:
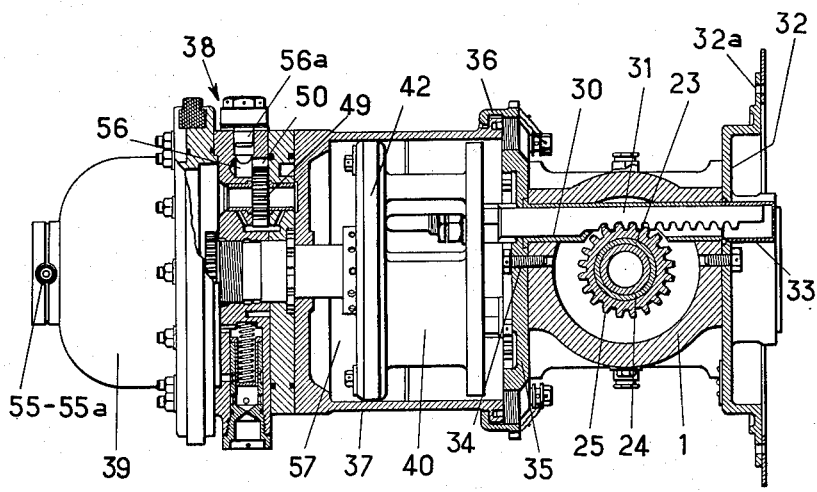
Figure 3 is a cross-sectional view taken along the line III—III of Figure 1.

As shown in the drawings, the propeller controlled by an automatic hydraulic governor according to the invention comprises a hub 1 which is provided on its inner surface with grooves 2 fitting into corresponding grooves 3 cut into the propeller shaft 4. The conical elements 5 and 5a positioned in the hub at the two ends of the grooves enable the propeller to be correctly centered on the shaft 4.

A nut 6 screwed on the end of the shaft 4 clamps the hub 1 tightly thereon acting through the cones 5 and 5a. This nut 6 carries at its forward end a series of notches 6a permitting it to be held tightly in place by means of the outer protuberance 7a of a stop 7 held in place by means of a keeper ring 8. The stop 7 also carries an inner protuberance 7b cooperating with the notches 9a of an intermediate sleeve 9 screwed into the drive shaft 4. The sleeve journals through a bearing 10 a central shaft 11 fixed to the reduction gear (not shown) of the aforesaid drive shaft. This shaft 11 carries at its forward end grooves 12 engaging a driving dog clutch member 13 which controls the pitch changing mechanism hereinafter described in detail.

The arms 1a of the hub adapted to receive the blades 14 are provided on their inner surface with threads of a special shape into which a liner 17 is screwed with ball bearings 16 interposed therebetween, the liner being fastened to the base 14a of the corresponding blade 14.

When the pitch of the blades is changed, they turn in the helical raceways so formed.

A stop lug is fixed to the inside of each arm 1a at the base of the thread 15 to prevent the ball bearings 16 from falling out when the vane is rotated. A second lug positioned at the other end of the thread serves a like purpose by preventing the ball bearings from falling out of the other end of the arm.

The bushing 17 is clamped to the base of the blade by means of a keyed brake 20 engaging on the one hand a slot 21 in the end of the base 14a of the blade and, on the other hand, in notches 22 cut into the inner end of the bushing 17.

At the base of the hub arms is a centering lug 23 on which a ring 24, preferably of bronze, is force fitted. It is on this nipple that, in each arm, the foot of the vane 14a centers itself through a pinion 25 rigidly attached to the vane, as by the bolt 26. This pinion is clamped in position by means of the key of the above mentioned brake 20.

Each blade 14 is centered in part by means of the ring 24 and in part by means of a wear adjustment nut 27 bearing on the two piece conical element 53 gripping the chuck constituted by the key formed at the end of the arm of the hub 1a. A gasket retainer 28 is seated on the wear adjustment screw 27. This gasket retainer is keyed by means of notches on its periphery and clamped with the aid of a castellated nut 29 bearing on the nut 27. It holds in place two gaskets 28a, 28b designed to retain the lubricant of the helical race 15 and of the pinion 25. It also serves to limit the unscrewing of the blade in order to avoid loosening the bearing race 15 during the setting operations.

A sleeve 30 (Fig. 3) passes through each arm of the hub and serves as a guide for the rack 31 which meshes with the pinion 25 (Fig. 1).

At the rear end of the hub, adjacent the motor, is mounted a support 32 carrying caps 33 which cover the ends of the racks 31 to insure that the hub (Fig. 3) is adequately sealed.

A flange 35 is attached to the front of the hub, by means of bolts 34 for example, and constitutes the support for the pitch changing means or governor block. Once fixed in place, this flange immobilizes the sleeve 30 encircling the racks 31.

To this flange 35 is attached, for example by means of a castellated nut 36, a cylinder 37 in the end of which is mounted the automatic governor 38 followed by a chamber 39 adapted to receive the oil or other fluid which completes the hydraulic circuit so as to bring about the regulation of the propeller pitch. This chamber is divided into two compartments, 39a, 39b, by means of a partition 52 pierced by a connecting orifice 54.

Each rack 31 is connected to a piston 40 positioned in the cylinder 37 and guided to a tube 41 which runs through the bottom 37a of the cylinder and rests at its rear end on the aforesaid sleeve 9, fixed to the end of the propeller shaft 4. A tight fit by the piston 40 on both outside and inside is assured by two suitable sealing rings 42 and 43.

Figure 4:
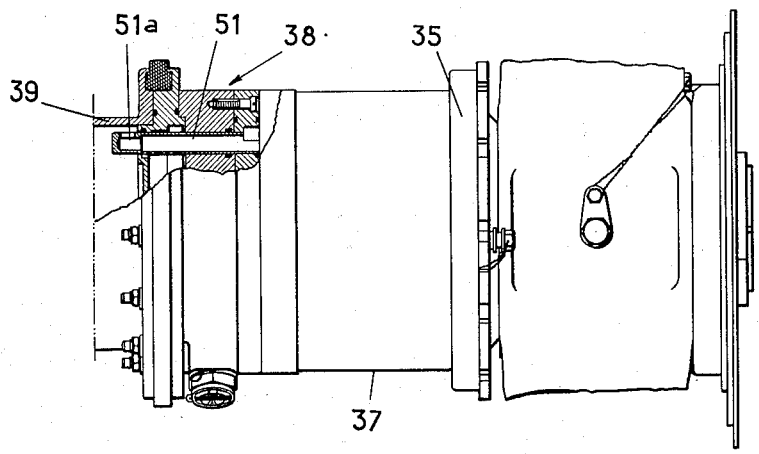
Figure 4 is an elevational view of the structure shown in Figure 3 with a part broken away along the line IV—IV of Figure 2.

The automatic governor assembly comprises a block 44 into which the front end of the sleeve 41 is screwed. A shaft 45 is rotatably mounted in the block 44 and carries at one end a dog clutch member 46 identical with the aforesaid dog clutch member 13 and connecting it to the aforesaid shaft 11. A sun gear 47 is fixed to the other end of the shaft 45 and a planetary pinion 48 turns about it and transmits its movement to a gear pump 49, the suction chamber of which is designated by reference numeral 50. This suction chamber communicates through the passageway 51 connected by an orifice 51a (Fig. 4) to the compartment 39b hereinbefore mentioned.

It should be noted that the partition 52 prevents emulsification of the oil as it comes to the suction of the pump 49.

Two valves 55 and 55a positioned at the opposite ends of the compartment 39b, are adapted to permit atmospheric pressure to penetrate to the interior of the chamber 39 during rotation of the propeller shaft, without permitting any oil to leak out therethrough when the engine is stopped.

The fluid necessary for the functioning of the apparatus is introduced into the reservoir 39 through the filling inlets 56 which can be closed by means of an appropriate screw plug 56a.

The air in the reservoir, in the mechanism and in the pressure chamber 57 in front of the piston 40 escapes through drain holes 58 which are opened when the apparatus is being filled.

The automatic governor comprises a chamber 59 to which are connected: a passage 60 communicating with the aforementioned pressure chamber 57, a conduit 61 opening into the compartment 39a, a passage 62 opening into a channel 63 connected by means of an annular groove 64 to the discharge chamber 50a of the pump. This channel 63 is connected by means of the duct 65 to the above mentioned compartment 39a. Between the ducts 61 and 65 is interposed a delivery valve 66 biased by a return spring which under normal conditions maintains it in a position blocking the duct 65 (position 66a indicated in dotted lines on Fig. 5).

A double-action slide valve 59 is positioned in the chamber 59 and comprises two heads 67a and 67b mounted on a hollow axle 67 and biased by an adjustable spring 68 suitably loaded. This slide valve, by opening and closing the above mentioned openings, in combination with the valve 66 and the piston 40 with its rack, brings about, as will hereinafter be explained, the automatic regulation of the propeller.

It should be noted that the automatic regulation of the pitch of the propeller is designed to suit the speed chosen for the turbine driving the shaft 4.

In order to facilitate the explanation of the operation which will now be made with reference to Figs. 5, 6, 7, 8 and 9, the various pressures to which the fluid is submitted in the course of the phases of regulation of the pitch of the propeller are indicated by means of cross-hatching differing in thickness.

The heaviest cross-hatching G1 indicates fluid subjected to the discharge pressure of the pump, the medium thickness cross-hatching G2 indicates fluid subjected to the pressure of the piston, and the lightest cross-hatching G3 indicates fluid subjected to the suction of the pump.

At the start, the propeller is at zero pitch, with the shoulder 31a of the rack 31 abutting against the bottom 37a of the cylinder 37. The valve member 66 occupies position 66a and blocks duct 65; the head 67a of the slide valve blocks the canal 61, while its head 67b leaves the passage 62 open in communication through the duct 60 with the pressure chamber 57 of the cylinder 37.

When, the turbine having been started, the propeller begins to rotate, this starts the pump functioning by means of the pinion 48 which turns about the planetary 47 keyed to the stationary shaft 45—11.

The pressure of the oil discharged by the pump becomes greater than that exerted by the spring biasing the valve 66, which then opens and comes to the position 66 in full lines, while maintaining in the discharge circuit of the pump the pressure required for the operation of the pitch regulating device. In this position it permits the entire displacement of oil to pass through the duct 65.

This oil passes into the interior of compartment 39a and thence into compartment 39b, through the orifice 54.

It should be noted that the valve 66 is so loaded that the hydraulic pressure exerted on the piston 40 is greater than the maximum force exerted by the helical ramp 15 in the direction of increased pitch.

So long as the speed for which the governor has been set (for example 2,420 r.p.m.) has not been reached, the propeller remains in zero pitch position (Fig. 5).

If the power delivered by the turbine is increased, the propeller reaches the speed for which the governor has been set and then passes it slightly. During the increase in speed, the slide valve 67 is subjected to centrifugal force and, compressing its spring 68, leaves the position shown in Fig. 5 and moves to that shown in Fig. 6 in which its head 67a, after having blocked the oil inlet passage 60, opens this passage and connects it to the pressure chamber 57 of the piston through the duct 61.

The oil can then return to the reservoir 39. At this moment, the propeller turns toward high pitch. Its blades turn helically with respect to their bearing races 15 displacing by means of the pinions 25 the racks 31 and consequently the pistons 40 in the direction of the arrow F2 (Fig. 6). The piston forces the discharge of oil into the compartment 39a (cross-hatched G3).

The pitch increases until the resistance force resulting from the pitch of the blades becomes equal to the moving force exerted by the turbine, when equilibrium is obtained (Fig. 7), with the head 67a blocking the passage 60, the oil in the chamber 57 no longer is able to run out of it and the propeller in the aforesaid stabilized position. The entire discharge of oil from the pump 49 passes through the valve 66 and returns to the reservoir through the passage 65.

As fast as the flying machine increases its speed, the propeller tends to increase its r.p.m. but it is brought back automatically to the predetermined speed by means of the slide valve 67, in the manner hereinbefore described (Fig. 6).

If, on the other hand, the propeller tends to slow down, the governor turns the propeller towards low pitch (Fig. 8).

When the propeller is in the stabilized position, if the power delivered by the turbine diminishes, the propeller speed diminishes and the slide valve 67 is forced toward the middle by its spring 68, thus slightly opening the passage 60 (Fig. 8). The oil under pressure discharged by the pump 49 passes through this passage 60 (arrow F3) and pushes back the piston 40 which, by means of the racks 31, turns the blades toward low pitch. The propeller speed then goes up again and the slide valve 67 is driven outward by centrifugal force, so that its head 67a completely blocks the passage 60. The device thus returns to the stabilized position shown in Fig. 7.

It should be noted that, in the case in which the predetermined speed is about to be exceeded and the high pitch stop does not permit a sufficient increase in pitch to offset the increased power delivered by the turbine (in case of defective adjustment) (Fig. 9), the described regulator will become inoperative and the propeller speed may increase. The turbine carries a safety device for this situation designed to diminish the feeding of motor fuel and thus reduce the propeller speed.

It will be appreciated that the scope of my invention is not limited to the embodiment described and that this embodiment may be modified without departing from the spirit of my invention.

What I claim is:

A self contained automatic variable-pitch propeller assembly, comprising in combination a hub fixed to a rotatable propeller shaft; propeller blades mounted in helical ball bearing races carried by said hub, the pitch of said races being such that as the propeller rotates the resulting centrifugal force acting on said blades urges them to turn in said races toward a high pitch position, a single action hydraulic piston mounted on said hub and carrying means for turning said blades in said races; a hydraulic system carried by said hub for supplying said piston with fluid under a pressure dependent upon the speed of rotation of said propeller and for receiving fluid from said piston, said hydraulic system comprising a gear pump driven through a rotating gear rotatably mounted in said hub in engagement with a stationary gear mounted on a fixed shaft extending coaxially through said propeller shaft, said rotating gear travelling planet-wise about said fixed gear as said hub rotates; and centrifugal control means carried by said hub and responsive to the speed of rotation of said propeller for controlling the flow of pressure fluid between said hydraulic system and said piston, the flow of fluid to said piston acting to turn said blades toward low pitch, and the flow from said piston permitting the centrifugal force on said blades to turn them toward a high pitch position.

References Cited in the file of this patent

UNITED STATES PATENTS

| | | |
|---|---|---|
| 2,257,126 | Rindfleisch | Sept. 30, 1941 |
| 2,460,559 | Wildhaber | Feb. 1, 1949 |
| 2,492,653 | Reck | Dec. 27, 1949 |
| 2,505,206 | Richardson et al. | Apr. 25, 1950 |
| 2,513,156 | Eaves | June 27, 1950 |
| 2,722,985 | Biermann | Nov. 8, 1955 |